July 28, 1959    W. A. ERNST    2,896,891
INSTRUMENT-SUPPORTING TRIPOD WITH SEAT
Filed March 26, 1956    3 Sheets-Sheet 1
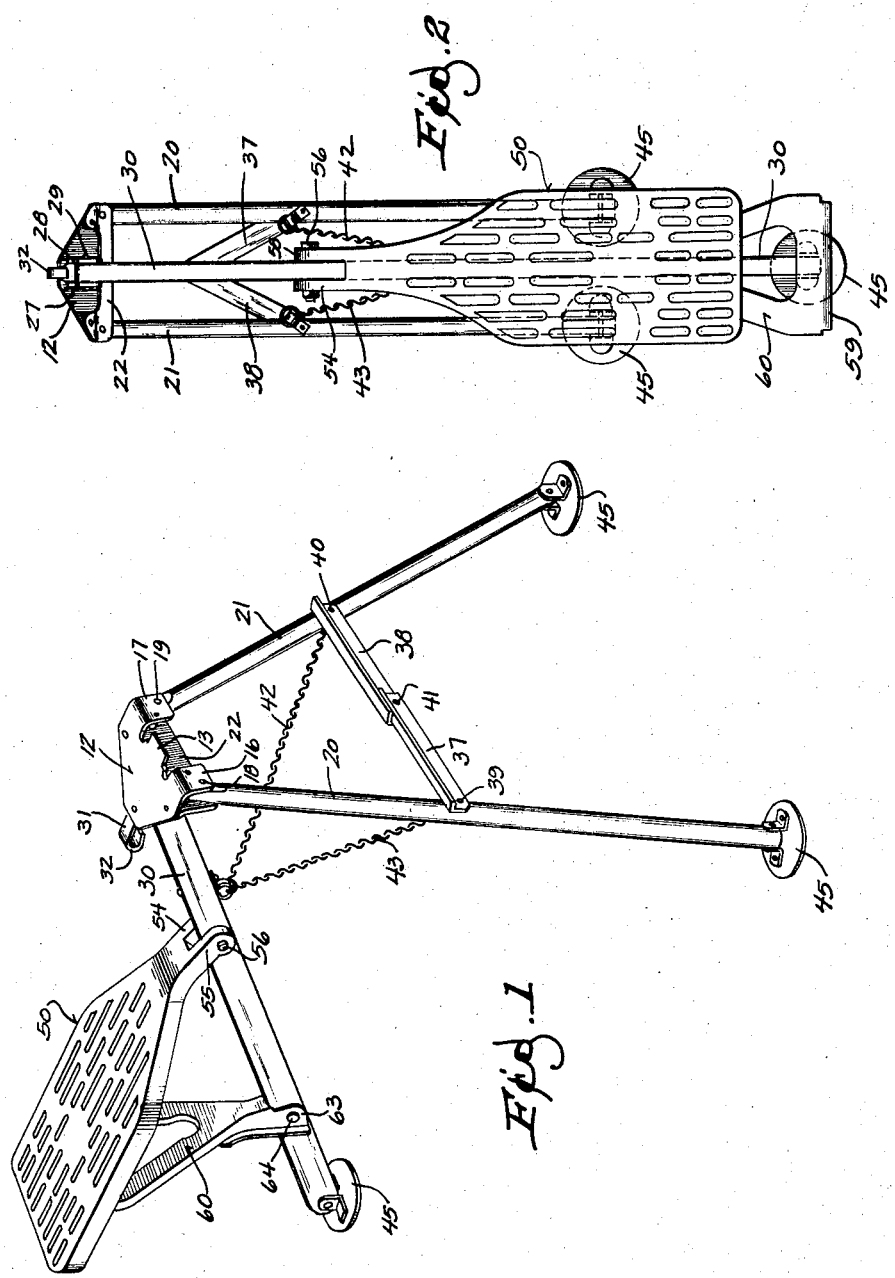
INVENTOR.
W. ARTHUR ERNST
BY
Wheeler, Wheeler + Wheeler
ATTORNEYS July 28, 1959
W. A. ERNST
2,896,891
INSTRUMENT-SUPPORTING TRIPOD WITH SEAT
Filed March 26, 1956
3 Sheets-Sheet 2
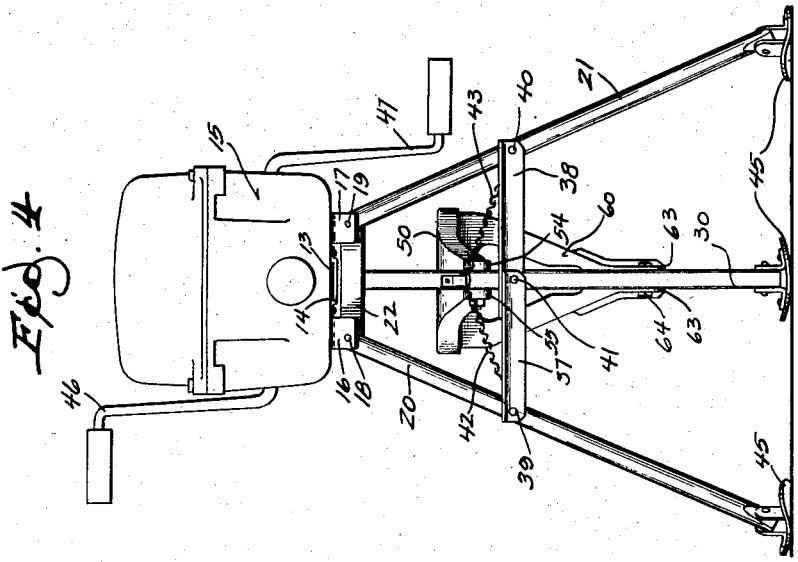
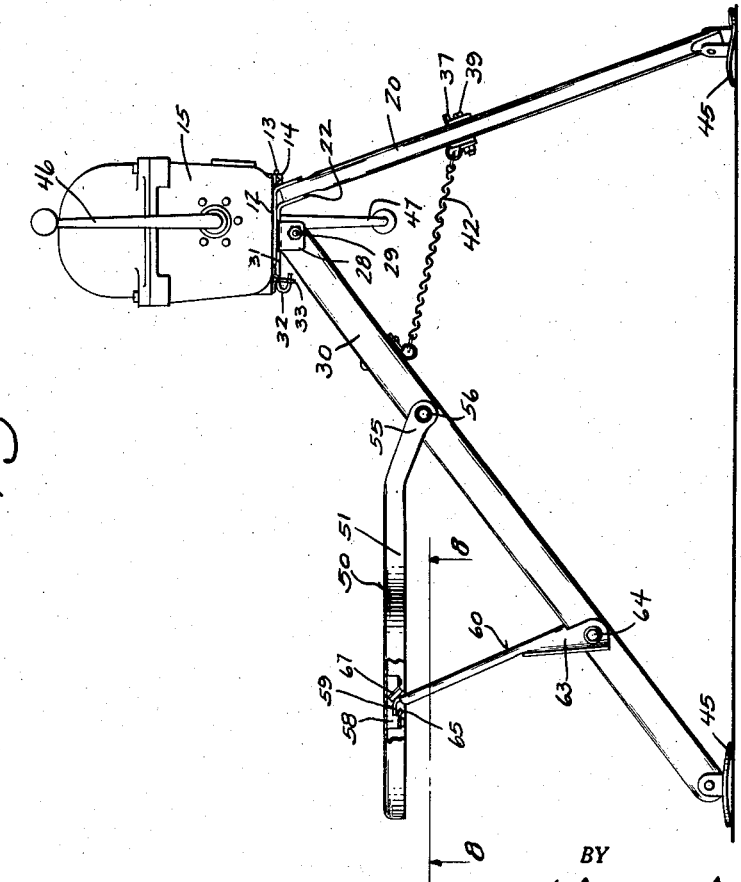
INVENTOR.
W. ARTHUR ERNST
BY
Wheeler, Wheeler + Wheeler
ATTORNEYS July 28, 1959 W. A. ERNST 2,896,891
INSTRUMENT-SUPPORTING TRIPOD WITH SEAT
Filed March 26, 1956 3 Sheets-Sheet 3
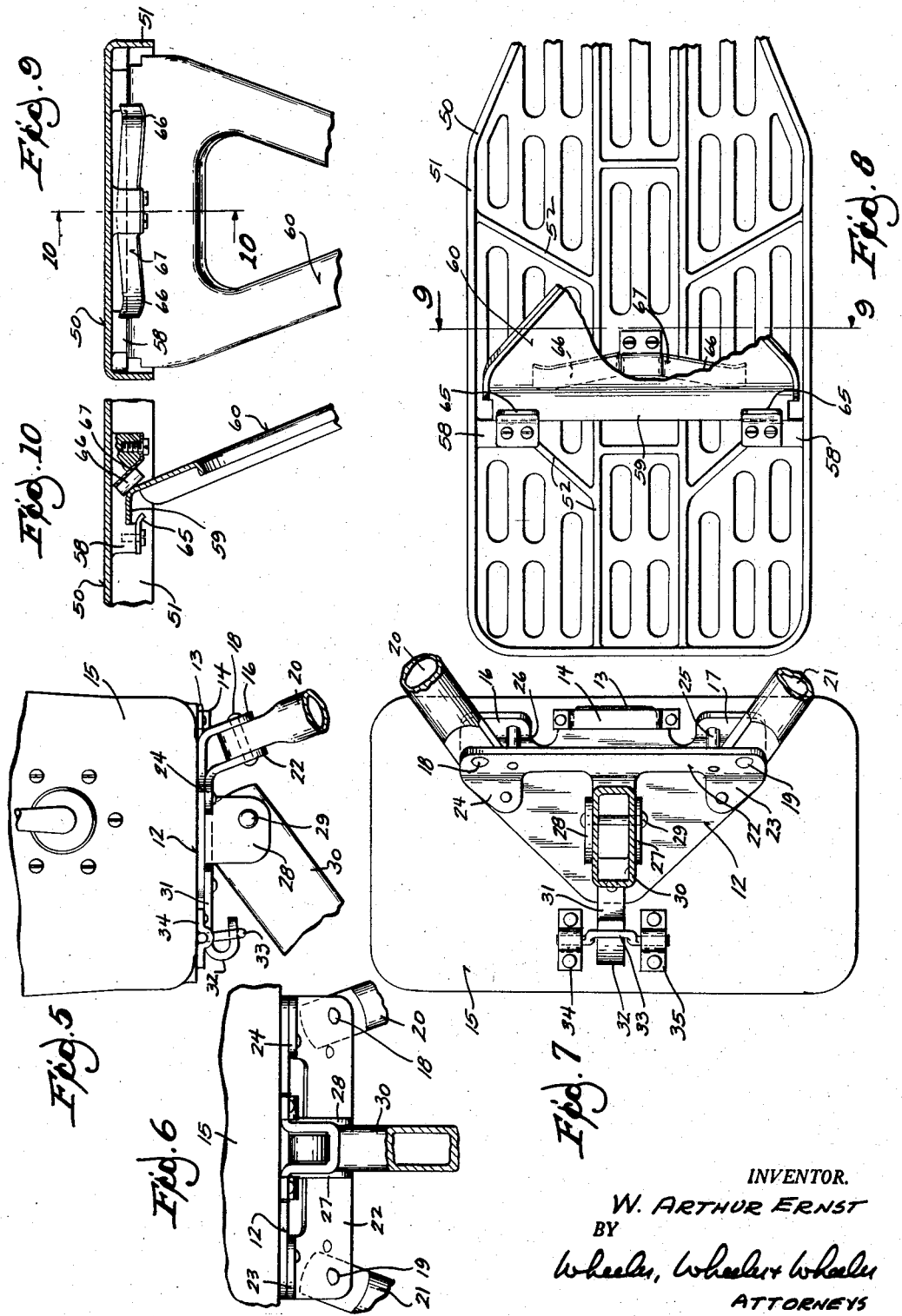
INVENTOR.
W. ARTHUR ERNST
BY
Wheeler, Wheeler & Wheeler
ATTORNEYS : 2,896,891
Patented July 28, 1959

2,896,891

INSTRUMENT-SUPPORTING TRIPOD WITH SEAT

W. Arthur Ernst, Racine, Wis., assignor to Howard Industries, Inc., Racine, Wis., a corporation of Wisconsin Application March 26, 1956, Serial No. 573,815

5 Claims. (Cl. 248—168)

This invention relates to an instrument-supporting tripod with seat.

The particular purpose for which the tripod is designed is to support an electric generator for military usage and a seat for the operator of the hand cranked instrument.

There is a tripod head to which the instrument is detachably connected and with respect to which forward legs fold inwardly and a rear leg folds forwardly. Collapsible brace means support the forward legs and a flexible tension linking means holds the rear leg. The seat is mounted entirely on the rear leg and it, along with its supporting brace, is readily collapsible against the rear leg, whereby the entire tripod becomes a compact, flat package when folded. Each leg has pivoted at its lower end a downwardly convex foot for the tripod in the event the ground is soft.

The invention resides in features of construction which make the device strong and rigid and facilitate manufacture at minimum expense. The head of the tripod requires but the connection of a single piece to provide for the mounting of the instrument and the connection of all the legs. The head maintains its angle to the plane of the forward legs whether the latter are extended or folded, the resulting angle of the head being just sufficient to permit the rear leg and seat and brace to fold into parallelism with the forward leg. The brace for the seat engages the seat securely and is latched against accidental displacement but is readily released against the bias of the retaining spring when it is desired to collapse the tripod. The angle of the ears at the end of the seat offsets the seat just enough to clear the folded brace.

In the drawings:

Fig. 1 is a view of the tripod in perspective.

Fig. 2 is a plan view of the tripod folded.

Fig. 3 is a view of the tripod in side elevation with its generator mounted.

Fig. 4 is a view in front elevation across the device as shown in Fig. 3.

Fig. 5 is a fragmentary detail view on a greatly enlarged scale of the mounting of the generator on the tripod head from a viewpoint similar to that of Fig. 3.

Fig. 6 is a fragmentary detail view in rear elevation of the part shown in Fig. 5.

Fig. 7 is a bottom plan view of the tripod head and generator, the legs being shown in section.

Fig. 8 is a fragmentary bottom plan view of the tripod seat on a greatly enlarged scale from the viewpoint indicated by the line 8—8 of Fig. 3.

Fig. 9 is a view taken in section on the line 9—9 of Fig. 8.

Fig. 10 is a fragmentary detail view taken in section on line 10—10 of Fig. 9.

The tripod head 12 comprises a generally triangular plate notched at its forward portion to provide a forwardly directed tongue 13 which is receivable within the strap 14 on the under side of the generator 15, as best shown in Fig. 7.

Ears 16 and 17 integral with the forward margins of the head 12 extend downwardly therefrom at oblique angles. Pivot means at 18 and 19 for the forward legs 20 and 21 extend rearwardly through the ears 16 and 17 into the complementary ear means 22 which take the form of a flange extending clear across the head on the under side thereof and having tabs 23, 24 riveted to the head 12. The shoulder rivets 25 and 26 provide rigid connection between the ears 16 and 17 and the ear means 22.

The ear means 22 passes across the under side of the head and is part of a fitting which provides ears 27 and 28 connected by pintle 29 for the support of the rear leg 30. There is also a strap 31 which is an integral part of this fitting and extends rearwardly and is folded back upon itself at 32 to receive a pivoted instrument clasp or buckle 33 pivoted to instrument 15. The ends of this clasp or buckle 33 are rotatably anchored in straps 34 and 35 on the under side of the instrument. With the strap 14 of the instrument engaged with tongue 13 of the tripod head, and the buckle 33 of the instrument pivoted beneath the reversely folded end 32 of strap 31 of the tripod head, the instrument is securely positioned on the tripod.

The legs 20 and 21 may be pivoted upon their pintles 18 and 19 between the divergent position of Fig. 1 and the collapsed position of Fig. 2. In the collapsed position, they are substantially parallel. Their outward swinging movement is limited by the angle iron toggle links 37, 38 which are pivoted to the legs at 39 and 40, respectively, and are pivoted to each other at 41. When the legs are folded, the links pivot upwardly as shown in Fig. 7.

The rear leg 30 has limited pivotal movement upon its pintle 29 between ears 27 and 28 between the folded position of Fig. 2 and the rearwardly extended position of Fig. 1. Rearward movement of the rear leg is limited by tension linkage, as for example, the chains 42, 43.

All of the legs are desirably provided with pivotally adjustable downwardly convex feet 45 of substantial area for supporting the tripod when the ground is soft.

A seat is provided for the operator of the instrument, here illustrated, by way of exemplification, as a generator provided with cranks at 46 and 47 requiring manipulation by an operator. The seat 50 is reenforced by ribs and flanges 51, 52 as shown in Fig. 8. At its forward end, it tapers to integral ears 54 and 55 cross connected through the leg 30 by a pintle bolt 56 upon which the seat is movable between the collapsed position of Fig. 2 and the position of use in which it is illustrated in Figs. 1, 3 and 4.

Special ribs at 58 receive the thrust of the terminal flange 59 of brace 60 when the latter is raised from the collapsed position of Fig. 2 to the position of use shown in Figs. 1, 3 and 4. The brace terminates at the lower end in ears 63 which are pivoted at 64 on leg 30. Clips 65 are screwed to the under surfaces of ribs 58 to confine flange 59 into position of use as best shown in Figs. 8 and 10. In order to engage the flange 59 with the ribs 58 above clip 65, it is necessary to force the flange into position against the bias of the arms 66 of a leaf spring 67 screwed to the under side of the seat. The spring prevents any accidental release of the connection between the brace and seat and yet accommodates sufficient deflection so that the parts may readily be engaged and disengaged as required.

The resulting tripod is extremely sturdy and provides rigid support for the instrument as well as for its operator. Yet it can be collapsed in a moment into the compact package shown in Fig. 2.

I claim:

1. In a tripod, the combination with a planiform head plate having edge margin portions inclined to the plane of said plate to constitute laterally spaced depending ears, of a separately fabricated fitting having mounting portions secured in face relation to the under side of the plate and unitarily providing inclined ear means complementary to the ears first mentioned and further providing ear means substantially at right angles to the ear means of said fitting, legs pivotally mounted to the first mentioned ears and complementary ear means aforesaid, and another leg pivotally connected to the last mentioned ear means of said fitting.

2. A mounting support comprising a planiform head plate having a pair of laterally spaced integral obliquely depending ears, a separately fabricated fitting having mounting portions secured in face relation to the under surface of the head plate and provided with oblique ear means complementary to the respective ears and spaced therefrom, legs pivoted between the respective ears and the ear means of the fitting upon pintles mounted in the respective ears and ear means, and additional leg means in pivotal connection with said head.

3. The device of claim 2 in which said fitting extends rearwardly from the ear means aforesaid and is laterally provided with depending flanges having a pintle extending between them and upon which the last mentioned leg means is pivoted.

4. The device of claim 2 in which said plate is provided with a marginal tongue projecting between the laterally spaced ears, said fitting having a strap portion extending rearwardly from said tongue and projecting beyond said plate to provide an anchorage.

5. A tripod comprising the combination with a mounting plate constituting a tripod head, said plate being provided with a pair of obliquely downwardly depending ears laterally spaced, pintles mounted in the respective ears and provided with auxiliary supporting means for carrying them from said head, and a pair of legs pivoted on the respective pintles for movement toward and from parallelism, means for limiting the spread of the legs, means on the under side of the head providing an additional pintle support, another pintle mounted on said support and extending parallel to the direction in which the first mentioned ears are spaced, and a third leg pivoted on the last mentioned pintle and movable toward and from the folded position of the legs first mentioned, and tension links connecting the third leg with the legs first mentioned for limiting the outward movement of the third leg.

References Cited in the file of this patent

UNITED STATES PATENTS

| | | |
|---|---|---|
| 816,268 | Steindorf | Mar. 27, 1906 |
| 2,380,437 | Homrighausen | July 31, 1945 |
| 2,678,790 | Egger | May 18, 1954 |